(12) United States Patent
Huang

(10) Patent No.: US 11,336,043 B2
(45) Date of Patent: May 17, 2022

(54) PERIPHERAL COMPONENT COUPLER METHOD AND APPARATUS

(71) Applicant: Intel Corporation, Santa Clara, CA (US)

(72) Inventor: Yi Huang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 16/473,202

(22) PCT Filed: Mar. 31, 2017

(86) PCT No.: PCT/CN2017/078920
§ 371 (c)(1),
(2) Date: Jun. 24, 2019

(87) PCT Pub. No.: WO2018/176357
PCT Pub. Date: Oct. 4, 2018

(65) Prior Publication Data
US 2019/0356071 A1     Nov. 21, 2019

(51) Int. Cl.
*H01R 12/71*     (2011.01)
*H01R 12/73*     (2011.01)
(Continued)

(52) U.S. Cl.
CPC .......... *H01R 12/737* (2013.01); *G06F 1/185* (2013.01); *G06F 13/40* (2013.01); *H01R 12/716* (2013.01); *G06F 2213/0026* (2013.01)

(58) Field of Classification Search
CPC ................... H01R 12/71; H01R 12/73; H01R 12/716–777; G06F 13/40; G06F 1/185;
(Continued)

(56) References Cited

U.S. PATENT DOCUMENTS

| 9,065,225 B2 * | 6/2015 | Degner | H01R 12/737 |
| 2013/0084754 A1 * | 4/2013 | Mason | H01R 12/716 |
| | | | 439/637 |

(Continued)

FOREIGN PATENT DOCUMENTS

| CN | 102610584 A1 | 7/2012 |
| CN | 103943585 A | 7/2014 |
| CN | 105489568 A | 4/2016 |

OTHER PUBLICATIONS

International Search Report and Written Opinion dated Jan. 3, 2018 for International Application No. PCT/CN2017/078920, 11 pages.

*Primary Examiner* — Edwin A. Leon
*Assistant Examiner* — Milagros Jeancharles
(74) *Attorney, Agent, or Firm* — Schwabe, Williamson & Wyatt, P.C.

(57) ABSTRACT

Apparatus and method to facilitate increased input/output performance are disclosed herein. An apparatus may include one or more computing components; a first row of a plurality of pins and a second row of a plurality of pins located on a first side of the apparatus, wherein the first row is disposed on the first side between the one or more computing components and the second row; and a third row of a plurality of pins and a fourth row of a plurality of pins located on a second side of the apparatus, wherein the third row is disposed on the second side between the one or more computing components and the fourth row, and the second side to comprise a side opposite the first side, wherein the first, second, third, and fourth rows lack direct electrical coupling with each other and are electrically coupled to the one or more computing components.

16 Claims, 7 Drawing Sheets

(51) Int. Cl.
*G06F 1/18* (2006.01)
*G06F 13/40* (2006.01)
(58) Field of Classification Search
CPC ......... G06F 2213/0026; G06F 13/4221; G06F 13/4282; G06F 2213/0024
See application file for complete search history.

(56) References Cited

U.S. PATENT DOCUMENTS

| | | |
|---|---|---|
| 2015/0064939 A1 | 3/2015 | Rabinovitz |
| 2016/0170928 A1 | 6/2016 | Tamarkin et al. |

\* cited by examiner

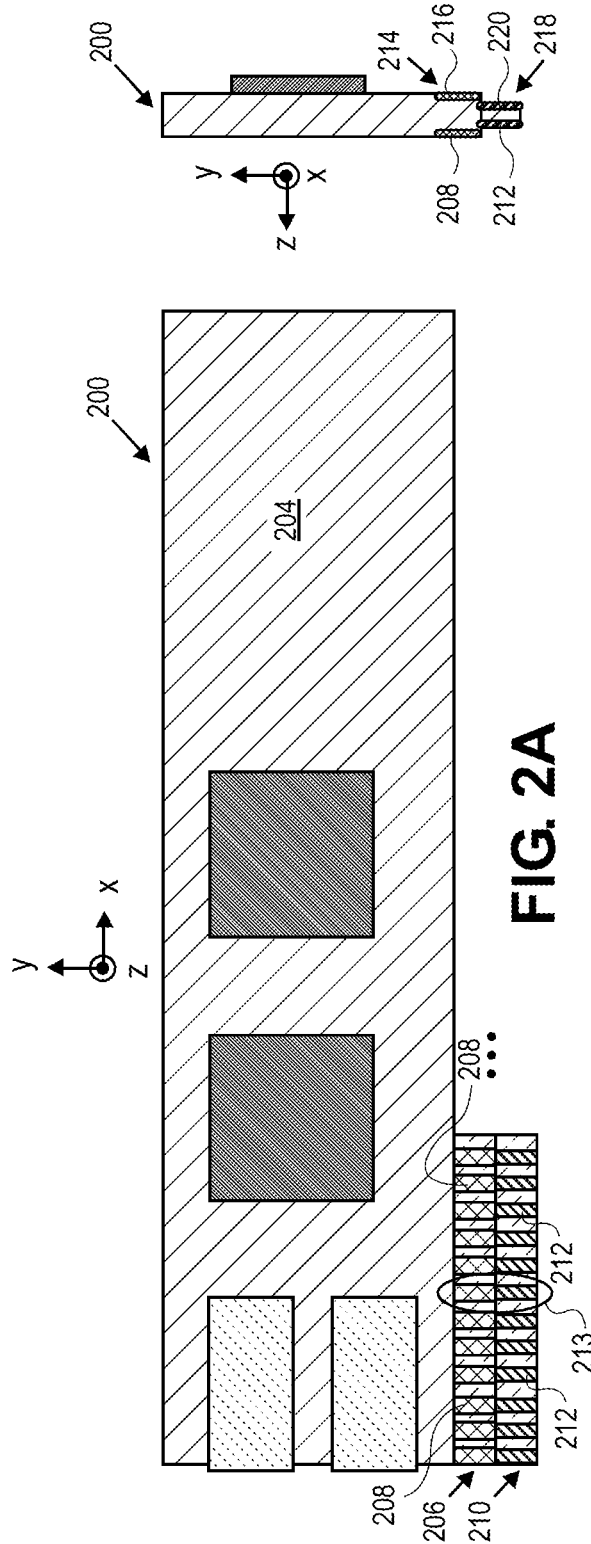
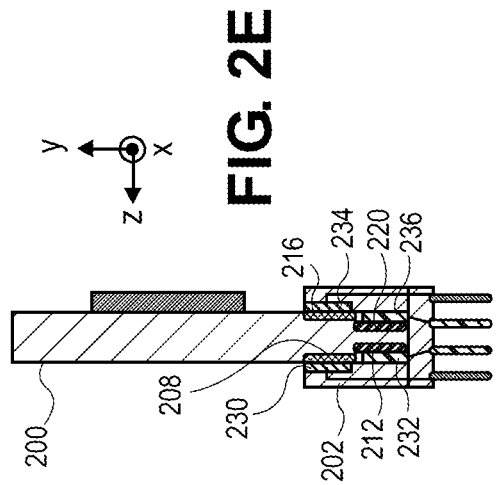
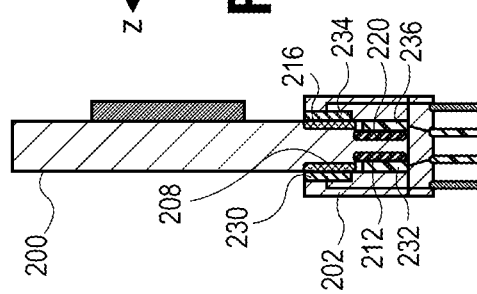
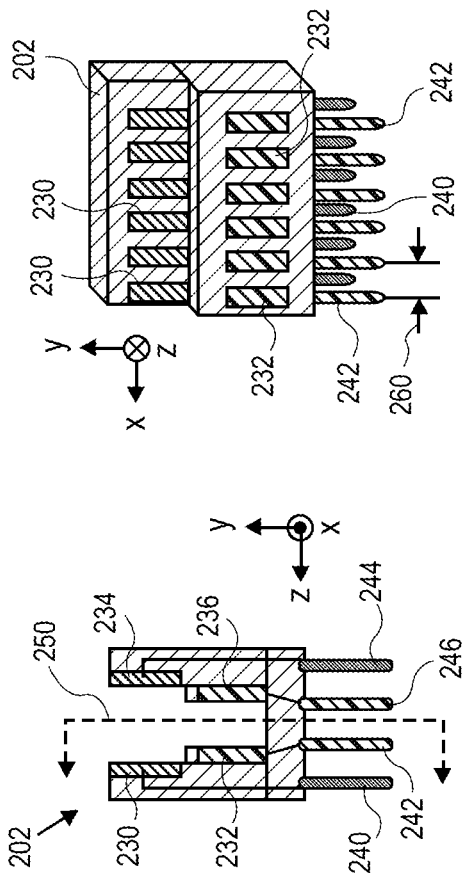

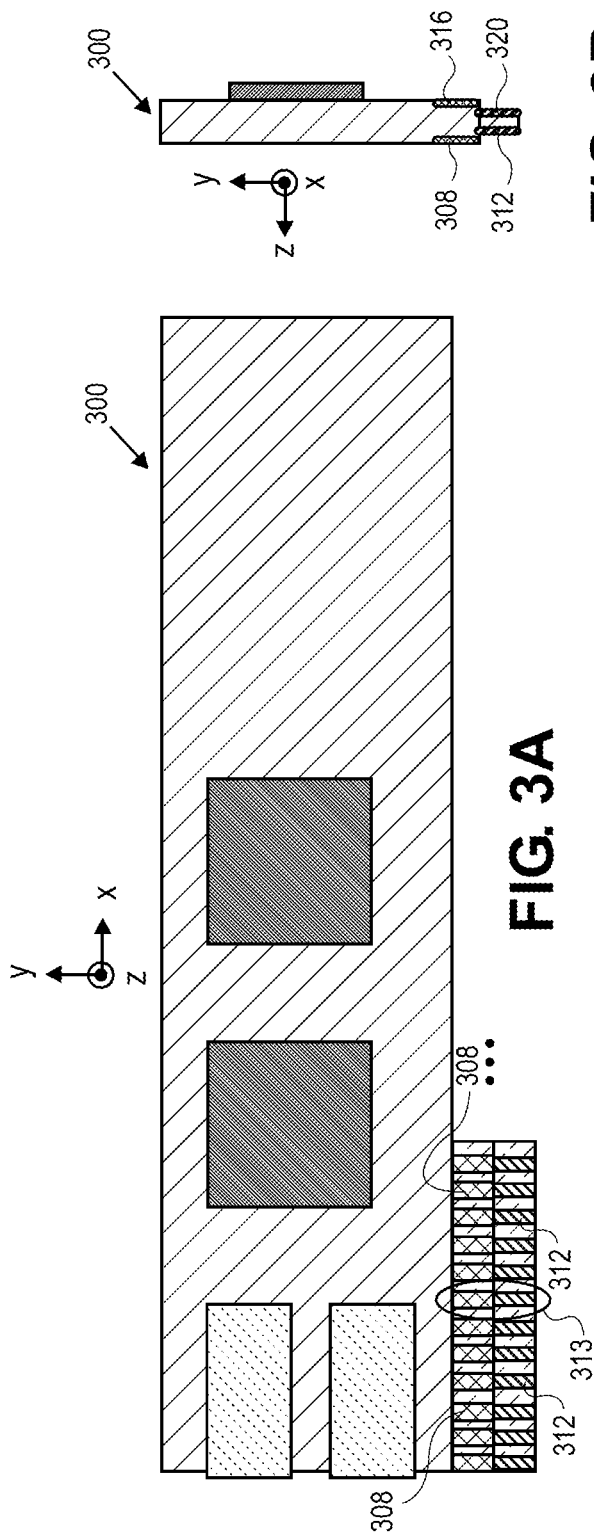
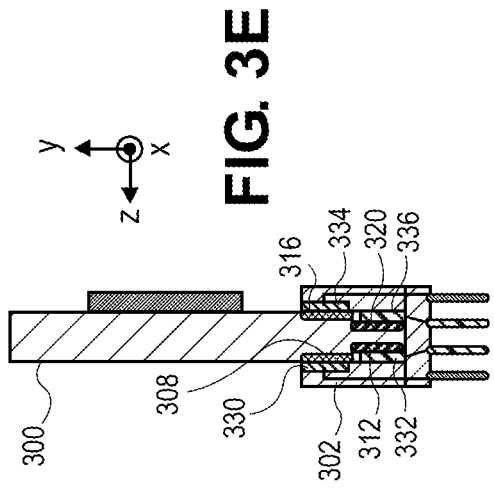
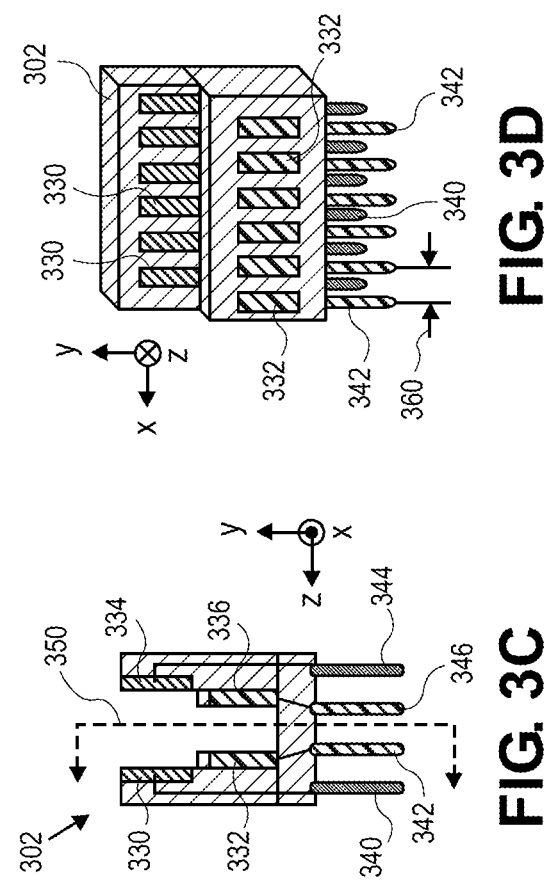
FIG. 3A
FIG. 3B
FIG. 3C
FIG. 3D
FIG. 3E

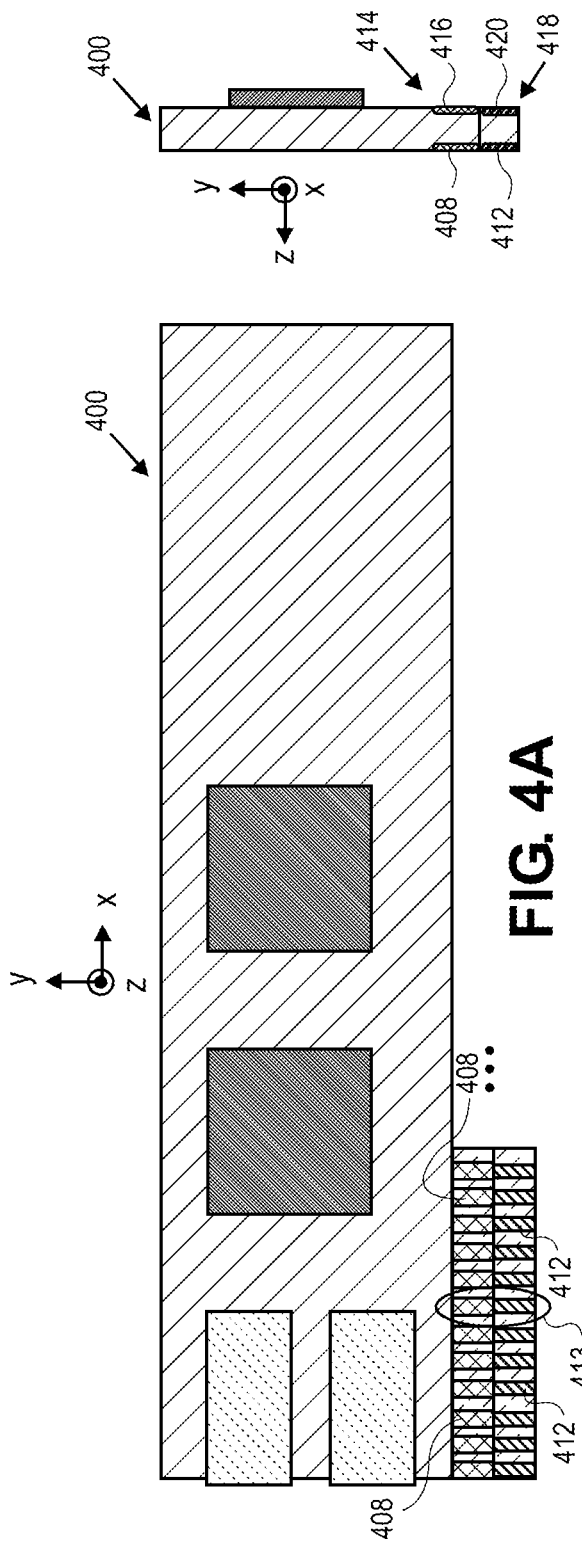
FIG. 4A
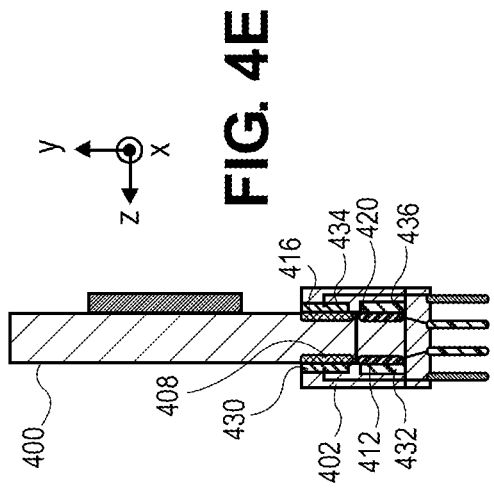
FIG. 4B
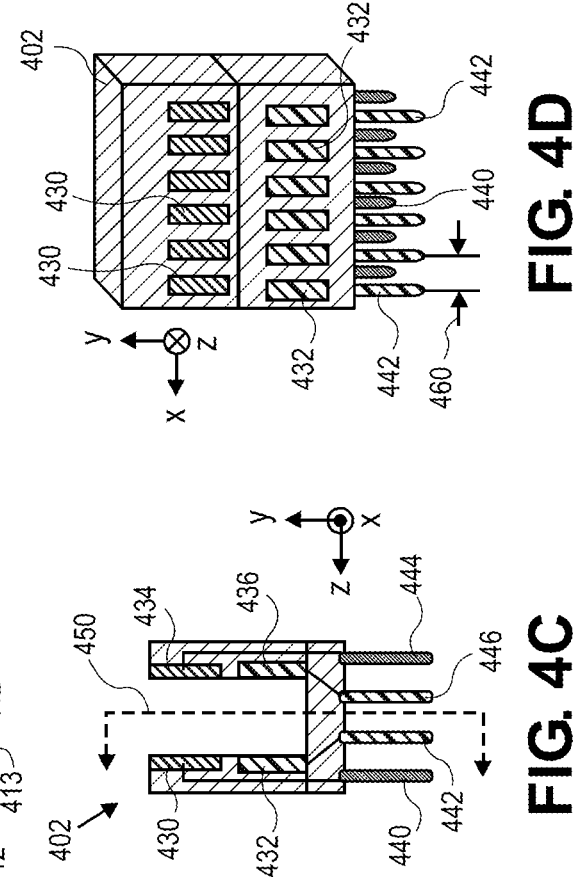
FIG. 4C
FIG. 4D
FIG. 4E

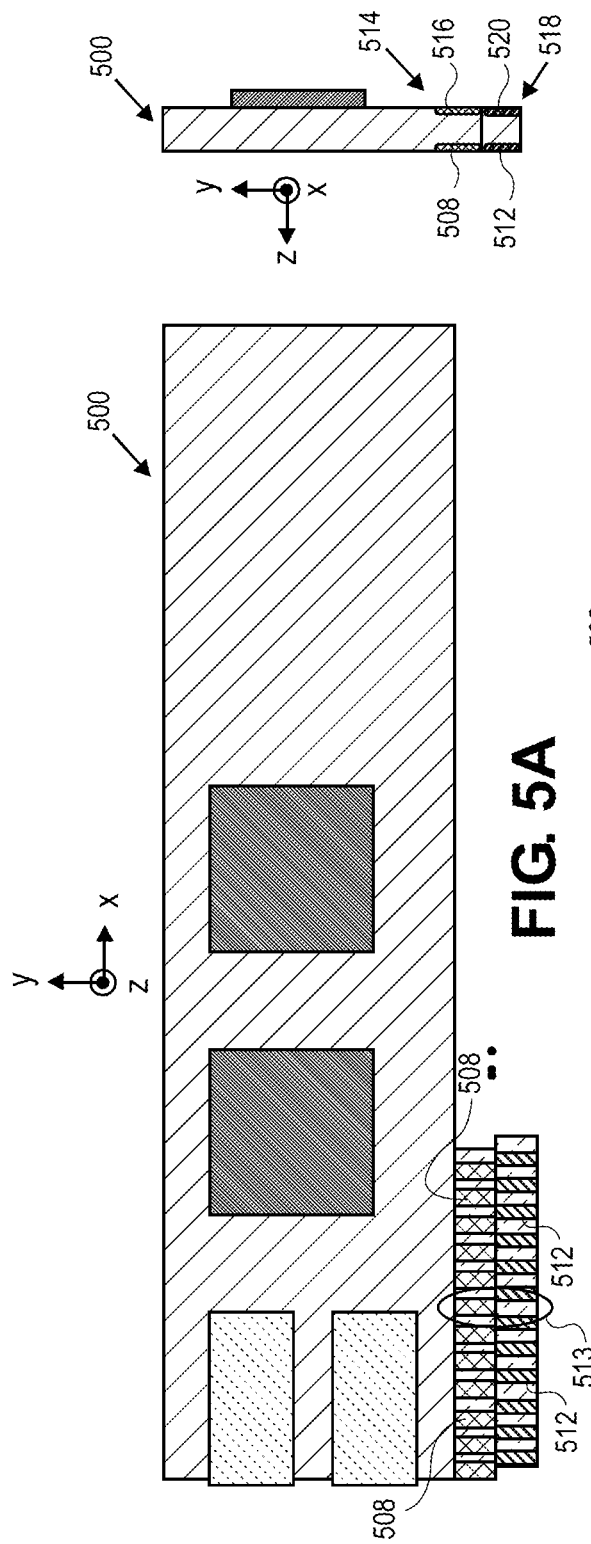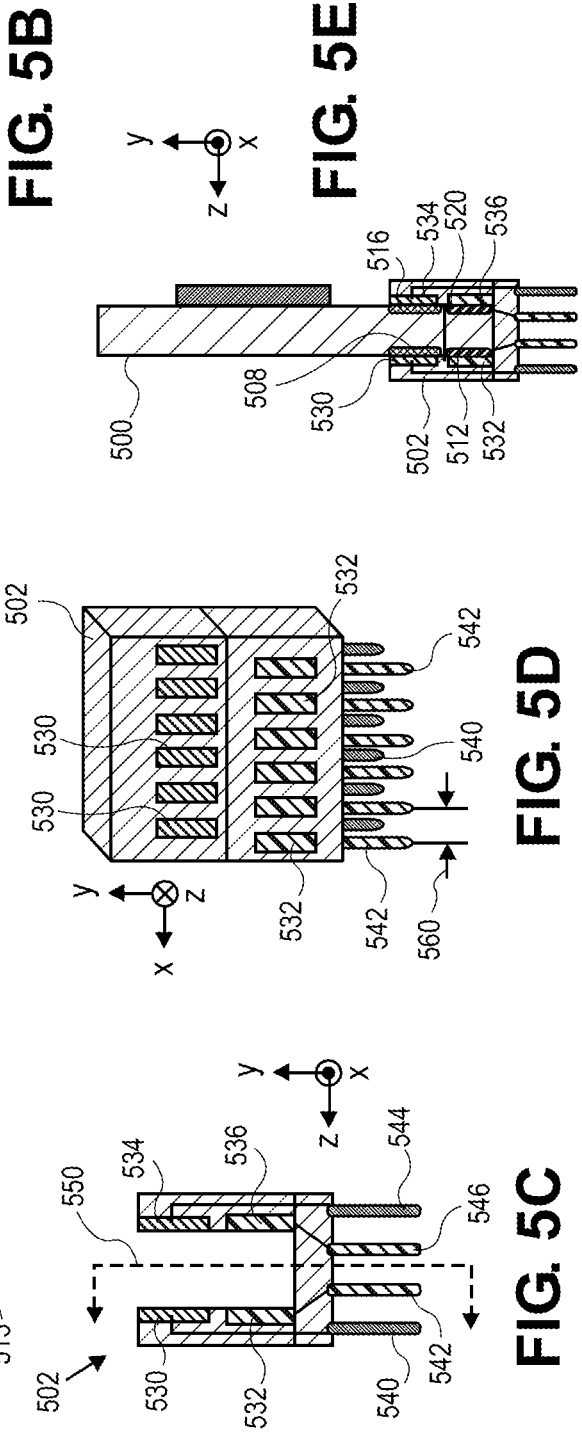

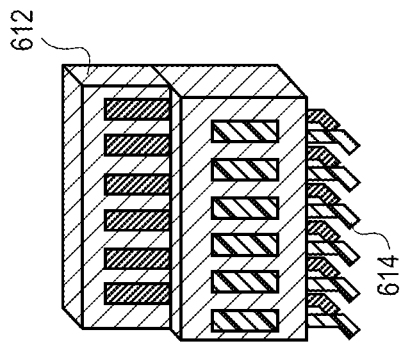
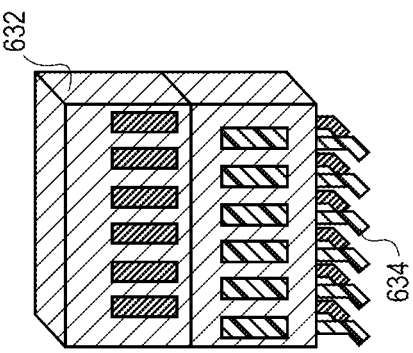
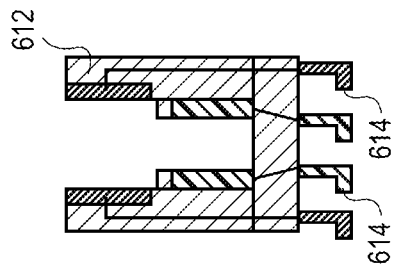
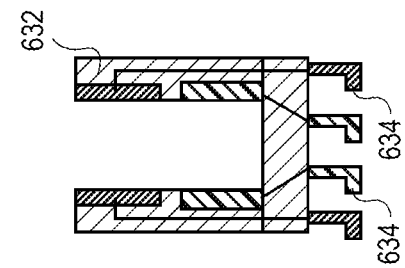
FIG. 6B
FIG. 6D
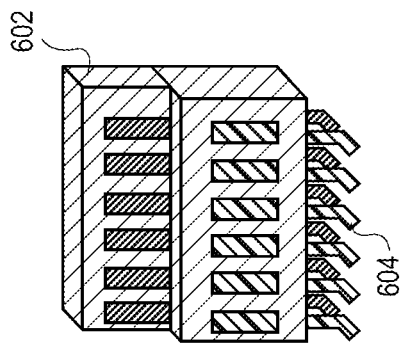
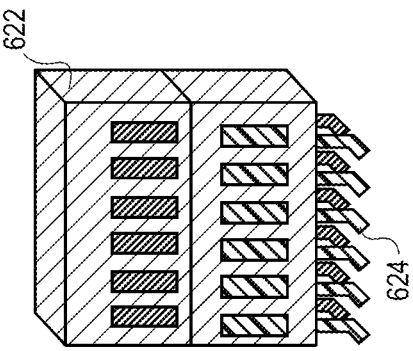
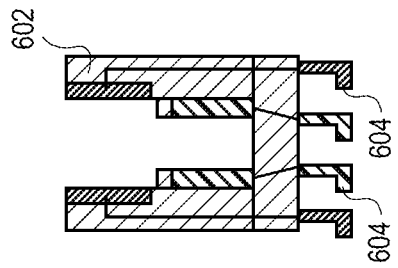
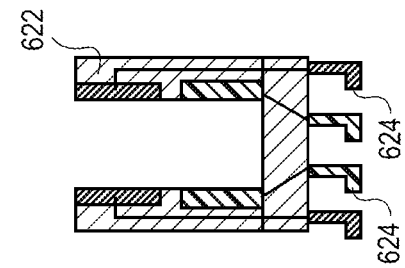
FIG. 6A
FIG. 6C

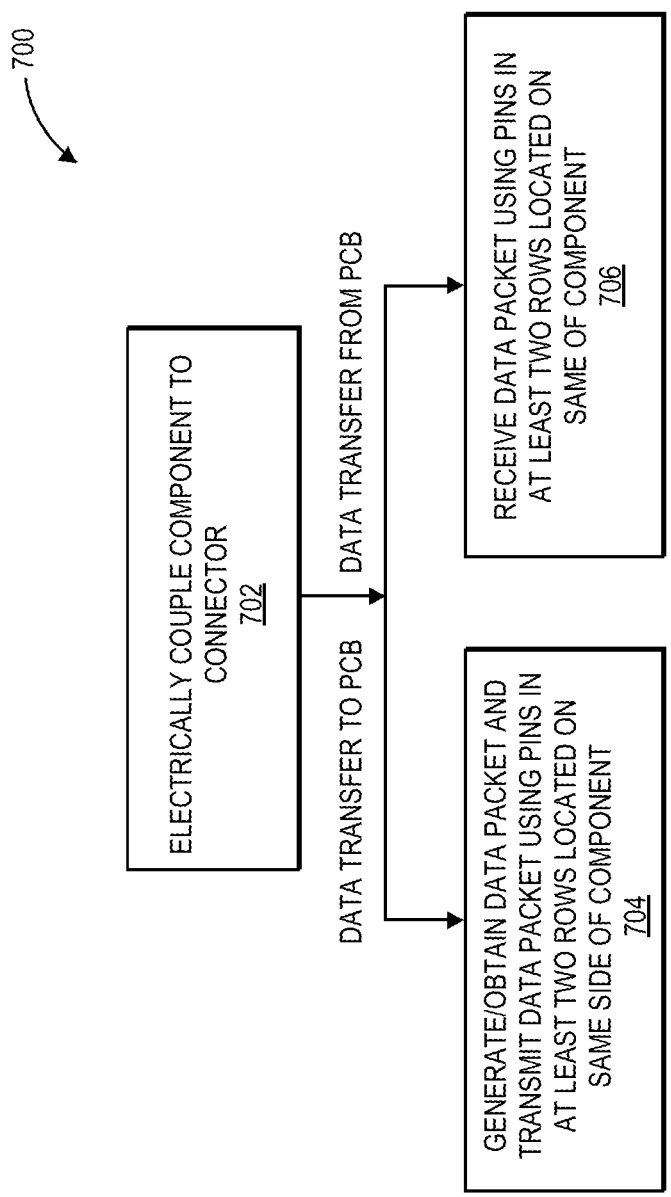

PERIPHERAL COMPONENT COUPLER METHOD AND APPARATUS

CROSS REFERENCE TO RELATED APPLICATIONS

The present application is a national phase entry under 35 U.S.C. § 371 of International Application No. PCT/CN2017/078920, filed Mar. 31, 2017, entitled "PERIPHERAL COMPONENT COUPLER METHOD AND APPARATUS", which designated, among the various States, the United States of America. The Specifications of the PCT/CN2017/078920 Application is hereby incorporated by reference.

FIELD OF THE INVENTION

The present disclosure relates generally to the technical field of computing, and more particularly, to peripheral component couplers to facilitate increased input/output performance.

BACKGROUND

The background description provided herein is for the purpose of generally presenting the context of the disclosure. Unless otherwise indicated herein, the materials described in this section are not prior art to the claims in this application and are not admitted to be prior art or suggestions of the prior art, by inclusion in this section.

While computing requirements may be ever increasing, the amount of physical space available to locate computing components to provide the required computing performance may be fixed or, in some cases, decreasing with the increasing popularity of small form factor mobile devices. Peripheral components, for example, may be located on and electrically coupled to printed circuit boards (PCBs), such as motherboards of devices, via coupler structures. Because the size of a PCB may be constrained by the size of the device in which it may reside, structures provided on the PCB, including coupler structures and peripheral components, may be similarly constrained in size.

To the extent that peripheral components may be capable of higher computing performance, having associated coupler structures to the PCB also capable of higher performance may be advantageous. Such coupler structures capable of higher performance without the need for more physical space on the PCB may be further advantageous.

BRIEF DESCRIPTION OF THE DRAWINGS

Embodiments will be readily understood by the following detailed description in conjunction with the accompanying drawings. The concepts described herein are illustrated by way of example and not by way of limitation in the accompanying figures. For simplicity and clarity of illustration, elements illustrated in the figures are not necessarily drawn to scale. Where considered appropriate, like reference labels designate corresponding or analogous elements.

FIGS. 2A-2E depict various views of an example component and associated connector, according to one embodiment.

FIGS. 3A-3E depict various views of an example component and associated connector, according to another embodiment.

FIGS. 4A-4E depict various views of an example component and associated connector, according to still another embodiment.

FIGS. 5A-5E depict various views of an example component and associated connector, according to yet another embodiment.

FIGS. 6A-6D depict example views of connectors including surface mounting pins instead of through hole pins, according to some embodiments.

FIG. 7 depicts an example process for performing data transfer using any of the component and connector of FIGS. 2A-2E, 3A-3E, 4A-3E, or 5A-5E, according to some embodiments.

DETAILED DESCRIPTION

Figure 1:
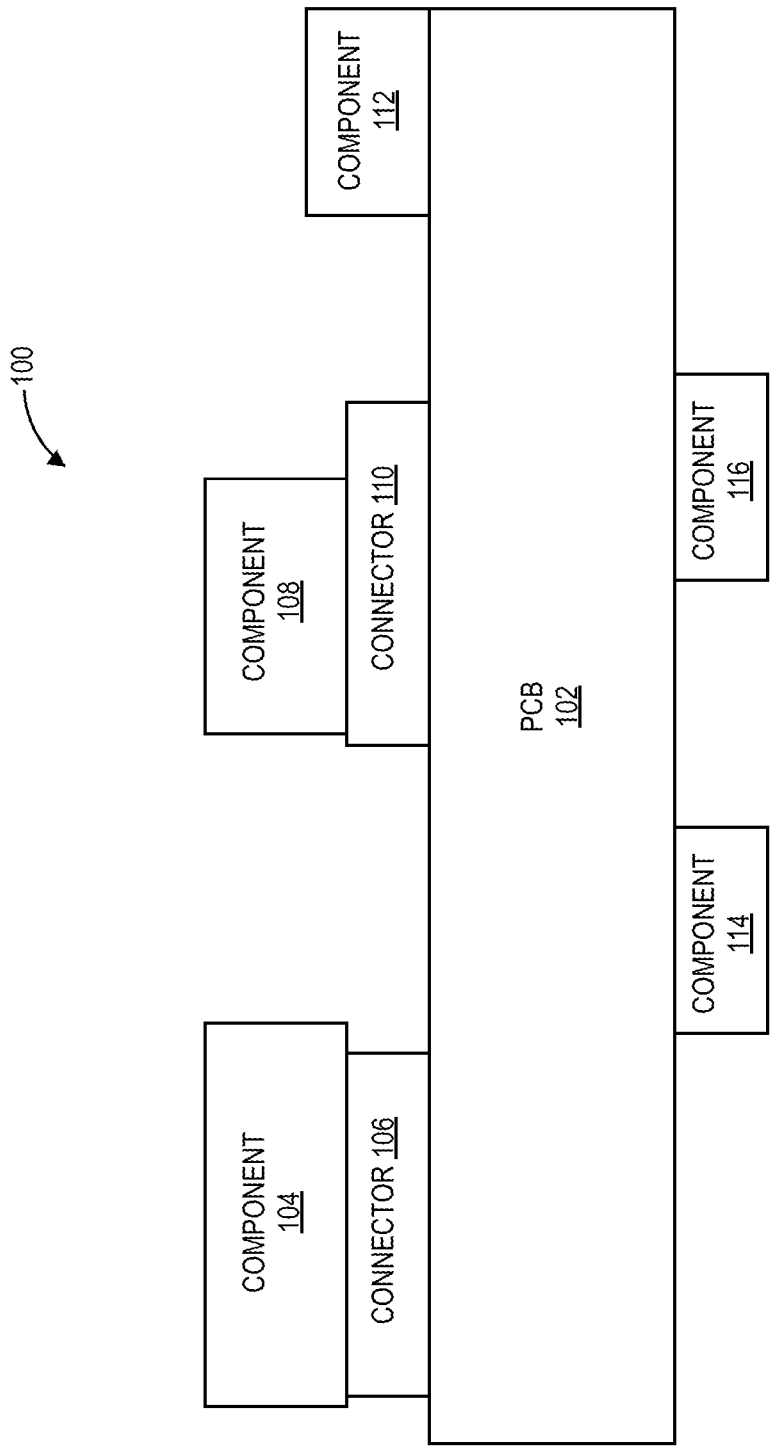
FIG. 1 depicts a block diagram illustrating an example apparatus incorporating aspects of the present disclosure, according to some embodiments.

Embodiments of apparatuses and methods related to peripheral component interconnect express (PCIe) cards and connectors are described. In embodiments, an apparatus may include one or more computing components; a first row of a plurality of pins and a second row of a plurality of pins located on a first side of the apparatus, wherein the first row is disposed on the first side between the one or more computing components and the second row; and a third row of a plurality of pins and a fourth row of a plurality of pins located on a second side of the apparatus, wherein the third row is disposed on the second side between the one or more computing components and the fourth row, and the second side to comprise a side opposite the first side, wherein the first, second, third, and fourth rows lack direct electrical coupling with each other and are electrically coupled to the one or more computing components. These and other aspects of the present disclosure will be more fully described below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

FIG. 1 depicts a block diagram illustrating an example apparatus 100 incorporating aspects of the present disclosure, according to some embodiments. Apparatus 100 may include a printed circuit board (PCB) 102, one or more components (e.g., components 104, 108, 112, 114, 116), and one or more connectors (e.g., connectors 106, 110). In some embodiments, connector 106 may be disposed between the component 104 and PCB 102, and in which the component 104 may be at least partially located in or inserted into the connector 106 to establish electrical coupling between the component 104 and connector 106. The connector 106, in turn, may be electrically coupled to the PCB 102 (or a particular component in or portion of the PCB 102). The connector 110 may be disposed between the component 108 and PCB 102, and in which the component 108 may be at least partially located in or inserted into the connector 110 to establish electrical coupling between the component 108 and connector 110. The connector 110, in turn, may be electrically coupled to the PCB 102 (or a particular component in or portion of the PCB 102). Components 112, 114, and 116 may be disposed on one or other side of the PCB 102 and each may be electrically coupled to the PCB 102.

In some embodiments, apparatus 100 may be included in a computing device such as, but not limited to, a computer, server, mobile device, computing unit, laptop, smartphone, tablet, work station, set top box, router, switch, gateway, firewall, computing interfaces, computing nodes, data center, server farm, or any device that uses the peripheral component interconnect express (PCIe) standard. PCB 102 may comprise a motherboard, in some embodiments. Although not shown, PCB 102 may also include circuitry, chips, interconnects, vias, traces, and/or other components.

Components 104, 108, 112, 114, 116 may comprise computing components such as, but not limited to, processors, memories, central processing units (CPUs), graphical processing units (GPUs), controllers, circuitry, interfaces, adapters, accelerators, and the like. In some embodiments, components 104, 108 and connectors 106, 110 may comprise components and connectors associated with the PCIe standard. Components 104, 108 may comprise PCIe cards or PCIe add-in cards having four rows of input/output pins or signal traces up to 256 pins or signal traces or more than 256 pins or signal traces, as described in detail below. Connectors 106, 110 may comprise PCIe connectors, PCIe cards, PCIe riser connectors, or PCIe riser cards having corresponding rows of input/output pins or signal traces as respective components 104, 108, as described in detail below. The number of pins/signal traces included in one or more of components 104, 108 and connectors 106, 110 may be greater in number while occupying the same amount of space (e.g., same length) on the PCB 102 as conventional PCIe cards/connectors. Or the number of pins/signal traces included in one or more of components 104, 108 and connectors 106, 110 may be the same number while occupying less amount of space (e.g., half the space, half the length) on the PCB 102 as conventional PCIe cards/connectors.

Components 104, 108 may also be referred to as staggered form factor PCIe cards, higher density PCIe cards, PCIe components, PCIe peripheral components, peripheral computing component, and the like. Connectors 106, 110 may also be referred to as staggered form factor PCIe connectors/cards, staggered form factor PCIe riser connectors/cards, higher density PCIe connectors/cards, higher density PCIe riser connectors/cards, and the like.

FIGS. 2A-2E depict various views of an example component 200 and associated connector 202, according to one embodiment. FIG. 2A depicts a first side view of the component 200; FIG. 2B depicts a second side view of the component 200; FIG. 2C depicts a side view of the connector 202; FIG. 2D depicts a cutaway perspective view of the connector 202; and FIG. 2E depicts a side view of the component 200 positioned in (or aligned with) and electrically coupled to the connector 202. Component 200 and connector 202 may comprise, for example, component 104 and connector 106, respectively, or component 108 and connector 110, respectively.

As shown in FIG. 2A, a first side of the component 200 may include a first portion 204—which may include one or more computing components such as memories, interfaces, processors, circuitry, and the like; a second portion 206—which may include a first row of a plurality of pins or signal traces 208; and a third portion 210 which may include a second row of a plurality of pins or signal traces 212. The second portion 206 may be spatially disposed between the first and third portions 204 and 210.

In some embodiments, the first and second rows 208, 212 may be located on or near an edge of the first side and may further be configured to correspondingly electrically couple with pins/signal traces included in the connector 202, as described in detail below. A length of the component 200 may be considered to be along the x-direction of a Cartesian coordinate system as shown in FIG. 2A. The first and second rows 208, 212 may extend along the length of the component 200 (e.g., along the x-direction). The length of the first and second rows 208, 212 may be less or equal to the length of the component 200.

The first and second rows 208, 212 may be parallel or substantially parallel to each other. Each pin/signal trace (also referred to as a trace, wire, or electrical trace) of the first and second rows 208, 212 may extend substantially along the y-direction. Each pin/signal trace of the first row 208 may be electrically isolated/separated from and substantially collinear with (e.g., along the y-direction) a respective pin/signal trace of the second row 212. Pin/signal trace of the first row 208 may have no direct electrical coupling with pin/signal trace of the second row 212. A given pin/signal trace of the first row 208 may be substantially collinear with the (nearest) adjacent pin/signal trace of the second row 212 in a direction perpendicular to a major direction (e.g., x-direction) of the first and second rows 208, 212. Thus, respective pairs of pins/signal traces of the first and second rows 208, 212 may be deemed to be in a line mode or configuration 213.

A side of the component 200 opposite to the first side shown in FIG. 2A may include a fourth portion 214—which may include a third row of a plurality of pins or signal traces 216, and a fifth portion 218—which may include a fourth row of a plurality of pins or signal traces 220, as shown in FIG. 2B. The third and fourth rows 216, 220 may also be in a line mode or configuration, with third row 216 disposed closer to the computing components than fourth row 220. In some embodiments, the first and third rows 208, 216 may be substantially collinear to each other on (directly) opposing sides of the component 200, and the second and fourth rows 212, 220 may be substantially collinear to each other (e.g., along the y-direction) on (directly) opposing sides of the component 200, as may be seen in FIG. 2B.

Additionally, the first and second rows 208, 212 may be located in a different plane from each other, and the third and fourth rows 216, 220 may be located in a different plane from each other. As shown in FIG. 2B, the distance between the second row 212 and fourth row 220 in a direction perpendicular to the length of the second and fourth rows 212, 220 may be smaller than the distance between the first row 208 and the third row 216 in the direction perpendicular to the length of the first and third rows 208, 216. In other words, the thickness or dimension of the component 200 (along the z-direction) may be smaller in the portion where the second and fourth rows 212, 220 may be located than the portion where the first and third rows 208, 216 may be located. Accordingly, the first and second rows 208, 212 may be deemed to be in a different plane mode or configuration. The third and fourth rows 216, 220 may similarly be deemed to be in a different plane mode or configuration. The component 200 may taper, indent, notch, step in, or otherwise contour to different thicknesses to provide first and second rows 208, 212 at a different plane from the third and fourth rows 216, 220.

In some embodiments, the pins/signal traces of the rows 208, 212, 216, 220 may comprise conductive traces of a metallic material such as copper or gold. Although not shown, the computing components included in the first portion 204 may be electrically coupled to particular pins/signal traces of the first, second, third, and/or fourth rows 208, 212, 216, 220 so that the computing components may have serial electrical connection to the PCB 102 (or portions thereof) via the connector 202 suitable for data communication in accordance with the PCIe standard.

In some embodiments, pins/signal traces of the rows 208, 212, 216, 220 may comprise a plurality of lanes, in which each lane of the plurality of lanes may comprise four pins/signal traces—two of the four pins/signal traces to be used for transmitting data and the remaining two pins/signal traces of a lane to be used for receiving data. Each lane may be used for full-duplex byte streams, in which data transport may comprise simultaneous bi-directional data transport (both transmitting and receiving directions) of eight-bit size data packets between the computing components included in the component 200 and the root complex or PCIe host included in the PCB 102, via the connector 202. From one to 32 lanes may be provided by the pins/signal traces of the rows 208, 212, 216, 220 (e.g., up to 128 pins/signal traces) occupying half the space (e.g., length) of conventional PCIe components on the PCB 102. Or from one to 64 lanes may be provided by the pins/signal traces of the rows 208, 212, 216, 220 (e.g., up to 256 pins/signal traces or more than 256 pins/signal traces) occupying the same (or approximately the same) space (e.g., length) as conventional PCIe components on the PCB 102. With lane counts expressed with an xN format, in which N may be the number of lanes, component 200 may comprise up to a dual x32 PCIe component, for example.

In some embodiments, component 200 may be considered roughly overall to have a rectangular prism form factor and the connector 202 may be considered roughly overall to have a rectangular prism form factor with a trench cutout along its length. The trench cutout (also referred to as an interior, a valley, or an interior cutout) of the connector 202 may include a plurality of pins/signal traces to contact and electrically couple with respective pins/signal traces of the rows 208, 212, 216, 220 of component 200. In some embodiments, the number of the plurality of pins/signal traces of the connector 202 to be electrically coupled to the pins/signal traces of the component 200 may be the same or more than the number of pins/signal traces included in the component 200. As shown in FIG. 2C, connector 202 may include a trench, valley, or cutout shape which matches the shape and dimensions of the portion(s) of the component 200 that includes the rows 208, 212, 216, 220.

In some embodiments, connector 202 may include along the interior sides, walls, or contours of the valley or interior cutout: a first connector row of a plurality of pins or signal traces 230 to electrically couple with respective pins/signal traces of the first row 208, a second connector row of a plurality of pins or signal traces 232 to electrically couple with respective pins/signal traces of the second row 212, a third connector row of a plurality of pins or signal traces 234 to electrically couple with respective pins; signal traces of the third row 216, and a fourth connector row of a plurality of pins or signal traces 236 to electrically couple with respective pins/signals of the fourth row 220. As with the rows 208, 212, 216, 220 of component 200, rows 230, 232, 234, 236 of connector 202 may lack direct electrical coupling with or between each other. Also as with the rows 208, 212, 216, 220, respective pins/signal traces of rows 230 and 232 may be arranged in the line mode or configuration 213 and the respective pins/signal traces of rows 234 and 236 may be arranged in the line mode or configuration 213.

The underside or bottom of the connector 202 (e.g., the side to be closest to the PCB 102 when connected) may include: a first pinout row of a plurality of pins or signal traces 240 electrically coupled to respective pins/signal traces of the first connector row 230, a second pinout row of a plurality of pins or signal traces 242 electrically coupled to respective pins/signal traces of the second connector row 232, a third pinout row of a plurality of pins or signal traces 244 electrically coupled to respective pins/signal traces of the third connector row 234, and a fourth pinout row of a plurality of pins or signal traces 246 electrically coupled to respective pins/signal traces of the fourth connector row 236.

The pins/signal traces of rows 240, 242, 244, 246 may be configured to contact, attach, and electrically couple to corresponding contact points in or on the PCB 102. In some embodiments, pins/signal traces of rows 240, 242, 244, 246 may comprise through hole pins which insert into the PCB 102 to establish electrical connect. Alternatively, the pins/signal traces of rows 240, 242, 244, 246 may comprise surface mounting connectors/pins which mount to the surface of the PCB 102 to establish electrical connect (as shown in FIG. 6A).

FIG. 2D depicts a cutaway view of the connector 202 along a view line 250 illustrated in FIG. 2C. The distribution of the pins/signals traces of first and second connector rows 230, 232 along the length of the connector 202 as well as those of the first and second pinout rows 240, 242 may be seen. A pitch 260 of pins/signal traces of rows 240, 242, 244, 246 may be approximately 0.8 to 1.0 millimeter (mm), in some embodiments.

The component 200 mated or inserted into the connector 202 is depicted in FIG. 2E. Note the complementary shapes, dimensions, or contours of the component 200 and connector 202 with each other so that once inserted, particular pins/signal traces of the component 200 and connector 202 may electrically couple to each other: pins/signal traces of first row 208 to pins/signal traces of first connector row 230, pins/signal traces of second row 212 to pins/signal traces of second connector row 232, pins/signal traces of third row 216 to pins/signal traces of third connector row 234, and pins/signal traces of fourth row 220 to pins/signal traces of fourth connector row 236.

FIGS. 3A-3E depict various views of an example component 300 and associated connector 302, according to another embodiment. The views depicted in FIGS. 3A-3E may be similar to respective FIGS. 2A-2E. Component 300 and connector 302 may comprise, for example, component 104 and connector 106, respectively, or component 108 and connector 110, respectively. Component 300 and connector 302 may be similar to component 200 and connector 202, respectively, except that the component and connector pins/signal traces included in the component 300 and connector 302 may be in an interweave mode or configuration 313 rather than the line mode or configuration 213 as in component 200 and connector 202. In FIG. 3A-3E, reference numbers that are the same reference numbers as in FIGS. 2A-2E except they start with the number "3" instead of the number "2" may be considered to refer to similar items as discussed above for corresponding reference numbers starting with "2" in FIGS. 2A-2E.

Component 300 may include four rows of a plurality of pins/signal traces, namely, rows 308, 312, 316, and 320. As shown in FIG. 3A, a given pin/signal trace of row 308 may be offset or non-collinear (along the y-direction) with adjacent pins/signal traces of row 312. Such arrangement may be referred to as the interweave mode or configuration 313. The pins/signal traces of rows 316 and 320, the pins/signal traces of rows 330 and 332, and the pins/signal traces of rows 334 and 336 may likewise be arranged in the interweave mode or configuration 313.

Accordingly, component 200 and connector 202 may comprise structures or devices in which its pins/signal traces may be arranged in different planes and in the line mode/configuration, while component 300 and connector 302 may comprise structures or devices in which its pins/signal traces may be arranged in different planes and in the interweave mode/configuration.

FIGS. 4A-4E depict various views of an example component 400 and associated connector 402, according to still another embodiment. The views depicted in FIGS. 4A-4E may be similar to respective FIGS. 2A-2E. Component 400 and connector 402 may comprise, for example, component 104 and connector 106, respectively, or component 108 and connector 110, respectively. Component 400 and connector 402 may be similar to component 200 and connector 202, respectively, except that the component and connector pins/signal traces included in the component 400 and connector 402 may be provided on the same plane on each side rather than on different planes as in component 200 and connector 202. In FIG. 4A-4E, reference numbers that are the same reference numbers as in FIGS. 2A-2E except they start with the number "4" instead of the number "2" may be considered to refer to similar items as discussed above for corresponding reference numbers starting with "2" in FIGS. 2A-2E.

Component 400 may include four rows of a plurality of pins/signal traces, namely, rows 408, 412, 416, and 420. As shown in FIG. 4B, rows 408 and 412 may be provided on the same (or substantially the same) plane on one side of the component 400, and rows 416 and 420 may be provided on the same (or substantially the same) plane on the (directly) opposite/opposing side of the component 400. The portions of the component 400 in which rows 408, 412, 416, and 420 may be located may be of the same thickness instead of tapering, indenting, or the like as in component 200. Correspondingly, the valley or interior cutout of the connector 402 may have straight or vertical walls so that rows 430 and 432 may be provided on a same plane on one interior wall/side of the connector 402 and rows 434 and 436 may be provided on a same plane on the opposing interior wall/side of the connector 402, as shown in FIG. 4C.

Accordingly, component 400 and connector 402 may comprise structures or devices in which its pins/signal traces may be arranged in the same planes and in the line mode/configuration.

FIGS. 5A-5E depict various views of an example component 500 and associated connector 502, according to yet another embodiment. The views depicted in FIGS. 5A-5E may be similar to respective FIGS. 2A-2E. Component 500 and connector 502 may comprise, for example, component 104 and connector 106, respectively, or component 108 and connector 110, respectively. Component 500 and connector 502 may be similar to component 200 and connector 202, respectively, except that the component and connector pins/signal traces included in the component 500 and connector 502 may be in an interweave mode or configuration 513 (as in the embodiment of FIGS. 3A-3E) and the component pins/signal traces may further be provided on the same planes on opposing sides of the component 500 (as in the embodiment of FIGS. 4A-4E). In FIG. 5A-5E, reference numbers that are the same reference numbers as in FIGS. 2A-2E except they start with the number "5" instead of the number "2" may be considered to refer to similar items as discussed above for corresponding reference numbers starting with "5" in FIGS. 2A-2E.

Accordingly, component 500 and connector 502 may comprise structures or devices in which its pins/signal traces may be arranged in the same planes and in the interweave mode/configuration.

FIGS. 6A-6D depict example views of connectors 202, 302, 402, 502 including surface mounting pins instead of through hole pins (e.g., rows 240-246, 340-346, 440-446, 540-546, respectively), according to some embodiments. In FIG. 6A, connector 602 may be similar to connector 202 except that rows of plurality of surface mounting connectors 604 may be provided on the underside/bottom of connector 602 instead of rows 240-246. The rows 604 may be the same as rows 240-246 except the connector ends furthest away from the underside/bottom of connector 602 may include an angled extension or protrusion, which may attach and electrically couple to the surface of the PCB 102. The angled extensions/protrusions of the surface mounting connectors/pins may be soldered, ball mounted, or otherwise affixed to the PCB 102.

Likewise, connector 612 in FIG. 6B may be similar to connector 302 except for the rows of plurality of surface mounting connectors 614 instead of rows 340-346. Connector 622 in FIG. 6C may be similar to connector 402 except for the rows of plurality of surface mounting connectors 624 instead of rows 440-446. Connector 632 in FIG. 6D may be similar to connector 502 except for the rows of plurality of surface mounting connectors 634 instead of rows 540-546.

FIG. 7 depicts an example process 700 for performing data transfer using any of component 200 and connector 202, component 300 and connector 302, component 400 and connector 402, or component 500 and connector 502, according to some embodiments. At a block 702, any of component 200, 300, 400, or 500 may be aligned or inserted into connector 202, 302, 402, or 502, respectively, to establish electrical coupling with the PCB 102. For purposes of illustration, it is assumed that electrical coupling may have been established between component 200 and connector 202.

When a data transfer to PCB 102 (or a component included in the PCB 102) is to occur, the computing components of the component 200 may generate and/or obtain one or more data packets and transmit such data packets using one or more pins/signal traces included in at least two rows of pins/signal traces located on a same side of the component 200, at a block 704. For instance, the data transfer may occur via one or more pins/signal traces included in the first and second rows 208, 212, or the data transfer may occur via one or more pins/signal traces included in the third and fourth rows 216, 220.

When a data transfer from the PCB 102 (or a component included in the PCB 102) is to occur, component 200 may receive one or more data packets on one or more pins/signal traces included in at least two rows of pins/signal traces located on a same side of the component 200, at a block 706. For instance, the data transfer may occur via one or more pins/signal traces included in the first and second rows 208, 212, or the data transfer may occur via one or more pins/signal traces included in the third and fourth rows 216, 220.

In this manner, increased computing performance, such as, but not limited to, increased input/output performance, from a higher density of pins/signal traces associated with peripheral components without a corresponding need for increase in physical space or footprint on the PCB 102 may be realized.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Illustrative examples of the devices, systems, and methods of various embodiments disclosed herein are provided below. An embodiment of the devices, systems, and methods may include any one or more, and any combination of, the examples described below.

EXAMPLE 1 is an apparatus including one or more computing components; a first row of a plurality of pins and a second row of a plurality of pins located on a first side of the apparatus, wherein the first row is disposed on the first side between the one or more computing components and the second row; and a third row of a plurality of pins and a fourth row of a plurality of pins located on a second side of the apparatus, wherein the third row is disposed on the second side between the one or more computing components and the fourth row, and the second side to comprise a side opposite the first side, wherein the first, second, third, and fourth rows lack direct electrical coupling with each other and are electrically coupled to the one or more computing components.

EXAMPLE 2 may include the subject matter of Example 1, and may further include wherein the first side of the apparatus includes a first plane portion and a second plane portion, the first row disposed on the first plane portion and the second row disposed on the second plane portion, the first and second plane portions to comprise different planes of the first side.

EXAMPLE 3 may include the subject matter of any of Examples 1-2, and may further include wherein the first side of the apparatus includes a first plane portion and a second plane portion, the first row disposed on the first plane portion and the second row disposed on the second plane portion, the first and second plane portions to comprise same planes of the first side.

EXAMPLE 4 may include the subject matter of any of Examples 1-3, and may further include wherein a pin of the first row and a pin of the second row adjacent to the pin of the first row are substantially collinear with each other in a direction perpendicular to a major direction of the first and second rows.

EXAMPLE 5 may include the subject matter of any of Examples 1-4, and may further include wherein a pin of the first row and a pin of the second row adjacent to the pin of the first row are non-collinear with each other in a direction perpendicular to a major direction of the first and second rows.

EXAMPLE 6 may include the subject matter of any of Examples 1-5, and may further include wherein the apparatus is to electrically couple with a printed circuit board (PCB) via a connector attached and electrically coupled to the PCB, wherein the connector includes an interior to receive and electrically couple with the first, second, third, and fourth rows of the apparatus.

EXAMPLE 7 may include the subject matter of any of Examples 1-6, and may further include wherein the apparatus comprises a peripheral component interconnect express (PCIe) card or a PCIe riser card.

EXAMPLE 8 may include the subject matter of any of Examples 1-7, and may further include wherein a total number of pins of the first, second, third, and fourth rows is up to 256 pins or more than 256 pins.

EXAMPLE 9 may include the subject matter of any of Examples 1-8, and may further include wherein the first row is disposed substantially parallel to the second row on the first side of the apparatus, and wherein the first and second rows are disposed at an edge of the first side of the apparatus.

EXAMPLE 10 is an apparatus including an interior cutout section including a first interior side that faces a second interior side, wherein a first row of a plurality of pins and a second row of a plurality of pins are disposed on the first interior side and a third row of a plurality of pins and a fourth row of a plurality of pins are disposed on the second interior side; and fifth, sixth, seventh, and eighth rows of a plurality of pins disposed below the interior cutout section, wherein respective pins of the first and fifth rows are electrically coupled to each other, respective pins of the second and sixth rows are electrically coupled to each other, respective pins of the third and seventh rows are electrically coupled to each other, and respective pins of the fourth and eighth rows are electrically coupled to each other, wherein the interior cutout section is shaped to contact and electrically couple with a component including four rows of a plurality of pins.

EXAMPLE 11 may include the subject matter of Example 10, and may further include wherein the first interior side includes a first plane portion and a second plane portion, the first row disposed on the first plane portion and the second row disposed on the second plane portion, the first and second plane portions to comprise different planes of the first interior side.

EXAMPLE 12 may include the subject matter of any of Examples 10-11, and may further include wherein the first interior side of the apparatus includes a first plane portion and a second plane portion, the first row disposed on the first plane portion and the second row disposed on the second plane portion, the first and second plane portions to comprise same planes of the first side.

EXAMPLE 13 may include the subject matter of any of Examples 10-12, and may further include wherein a pin of the first row and a pin of the second row adjacent to the pin of the first row are substantially collinear with each other in a direction perpendicular to a major direction of the first and second rows.

EXAMPLE 14 may include the subject matter of any of Examples 10-13, and may further include wherein a pin of the first row and a pin of the second row adjacent to the pin of the first row are non-collinear with each other in a direction perpendicular to a major direction of the first and second rows.

EXAMPLE 15 may include the subject matter of any of Examples 10-14, and may further include wherein the fifth, sixth, seventh, and eighth rows are to electrically couple with a printed circuit board (PCB).

EXAMPLE 16 may include the subject matter of any of Examples 10-15, and may further include wherein pins of the fifth, sixth, seventh, and eighth rows comprise through hole pins.

EXAMPLE 17 may include the subject matter of any of Examples 10-16, and may further include wherein pins of the fifth, sixth, seventh, or eighth rows comprise surface mounting pins.

EXAMPLE 18 may include the subject matter of any of Examples 10-17, and may further include wherein the apparatus comprises a peripheral component interconnect express (PCIe) connector.

EXAMPLE 19 may include the subject matter of any of Examples 10-18, and may further include wherein a total number of pins of the first, second, third, and fourth rows is up to 256 pins or more than 256 pins.

EXAMPLE 20 is an apparatus including a peripheral component interconnect express (PCIe) device including one or more computing components electrically coupled to first, second, third, and fourth rows of a plurality of pins, wherein the first and second rows are disposed on a first side of the PCIe device and the third and fourth rows are disposed on a second side of the PCIe device; and a PCIe connector including first, second, third, and fourth connector rows of a plurality of pins, wherein the first and second connector rows are disposed on a first interior side of the PCIe connector and the third and fourth connector rows are disposed on a second interior side of the PCIe connector, and wherein the PCIe device is aligned with the PCIe connector to cause respective pins of the first row and first connector row to electrically couple to each other, respective pins of the second row and second connector row to electrically couple to each other, respective pins of the third row and third connector row to electrically couple to each other, and respective pins of the fourth row and fourth connector row to electrically couple to each other.

EXAMPLE 21 may include the subject matter of Example 20, and may further include wherein the PCIe connector includes first, second, third, and fourth pinout rows of a plurality of pins, and wherein respective pins of the first connector row and first pinout row are electrically coupled to each other, respective pins of the second connector row and second pinout row are electrically coupled to each other, respective pins of the third connector row and third pinout rows are electrically coupled to each other, and respective pins of the fourth connector row and fourth pinout rows are electrically coupled to each other.

EXAMPLE 22 may include the subject matter of any of Examples 20-21, and may further include a printed circuit board (PCB) electrically coupled to the first, second, third, and fourth pinout rows.

EXAMPLE 23 may include the subject matter of any of Examples 20-22, and may further include wherein the pins of the first, second, third, and fourth pinout rows comprise through hole pins.

EXAMPLE 24 may include the subject matter of any of Examples 20-23, and may further include wherein the pins of the first, second, third, and fourth pinout rows comprise surface mounting pins.

EXAMPLE 25 may include the subject matter of any of Examples 20-24, and may further include wherein the first and second rows are disposed on different planes of the first side of the PCIe device.

EXAMPLE 26 may include the subject matter of any of Examples 20-25, and may further include wherein the first and second rows are disposed on a same plane of the first side of the PCIe device.

EXAMPLE 27 may include the subject matter of any of Examples 20-26, and may further include wherein a pin of the first row and a pin of the second row adjacent to the pin of the first row are substantially collinear with each other in a direction perpendicular to a major direction of the first and second rows.

EXAMPLE 28 may include the subject matter of any of Examples 20-27, and may further include wherein a pin of the first row and a pin of the second row adjacent to the pin of the first row are non-collinear with each other in a direction perpendicular to a major direction of the first and second rows.

EXAMPLE 29 may include the subject matter of any of Examples 20-28, and may further include wherein the first row is substantially parallel to the second row and the first row is disposed between the one or more computing components and the second row on the first side of the PCIe device.

EXAMPLE 30 is method including generating or obtaining a data packet by one or more computing components; and transmitting the data packet using at least one pin included in a first row of a plurality of pins and at least one pin included in a second row of a plurality of pins, wherein the first and second rows are disposed substantially parallel to each other on a same side of a peripheral device that includes the one or more computing components.

EXAMPLE 31 may include the subject matter of Example 30, and may further include receiving a second data packet using at least one pin included in a third row of a plurality of pins and at least one pin included in a fourth row of a plurality of pins, wherein the third and fourth rows are disposed substantially parallel to each other on another side of the peripheral device that is a side opposite the same side.

EXAMPLE 32 may include the subject matter of any of Examples 30-31, and may further include wherein a total number of pins of the first, second, third, and fourth rows is up to 256 pins or more than 256 pins.

EXAMPLE 33 may include the subject matter of any of Examples 30-32, and may further include wherein the peripheral device comprises a peripheral component interconnect express (PCIe) card or a PCIe riser card.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. An apparatus comprising:
one or more computing components;
a first row of a plurality of pins and a second row of a plurality of pins located on a first side of the apparatus, wherein the first row is disposed on the first side between the one or more computing components and the second row; and
a third row of a plurality of pins and a fourth row of a plurality of pins located on a second side of the apparatus, wherein the third row is disposed on the second side between the one or more computing components and the fourth row, and the second side to comprise a side opposite the first side,
wherein the first, second, third, and fourth rows lack direct electrical coupling with each other and are electrically coupled to the one or more computing components, and
wherein the first side of the apparatus includes a first plane portion and a second plane portion, the first row disposed on the first plane portion and the second row disposed on the second plane portion, the first and second plane portions to comprise different planes of the first side.

2. The apparatus of claim 1, wherein the second side of the apparatus includes a third plane portion and a fourth plane portion, the third row disposed on the third plane portion and the fourth row disposed on the fourth plane portion, the third and fourth plane portions to comprise different planes of the second side.

3. The apparatus of claim 1, wherein a pin of the first row and a pin of the second row adjacent to the pin of the first row are substantially collinear with each other in a direction perpendicular to a major direction of the first and second rows.

4. The apparatus of claim 1, wherein a pin of the first row and a pin of the second row adjacent to the pin of the first row are non-collinear with each other in a direction perpendicular to a major direction of the first and second rows.

5. The apparatus of claim 1, wherein the apparatus comprises a peripheral component interconnect express (PCIe) card or a PCIe riser card.

6. The apparatus of claim 1, wherein a total number of pins of the first, second, third, and fourth rows is up to 256 pins or more than 256 pins.

7. An apparatus comprising:
an interior cutout section including a first interior side that faces a second interior side, wherein a first row of a plurality of pins and a second row of a plurality of pins are disposed on the first interior side and a third row of a plurality of pins and a fourth row of a plurality of pins are disposed on the second interior side; and
fifth, sixth, seventh, and eighth rows of a plurality of pins disposed below the interior cutout section, wherein respective pins of the first and fifth rows are electrically coupled to each other, respective pins of the second and sixth rows are electrically coupled to each other, respective pins of the third and seventh rows are electrically coupled to each other, and respective pins of the fourth and eighth rows are electrically coupled to each other,
wherein the interior cutout section is shaped to contact and electrically couple with a component including four rows of a plurality of pins, and
wherein the first interior side includes a first plane portion and a second plane portion, the first row disposed on the first plane portion and the second row disposed on the second plane portion, the first and second plane portions to comprise different planes of the first interior side.

8. The apparatus of claim 7, wherein the second interior side of the apparatus includes a third plane portion and a fourth plane portion, the third row disposed on the third plane portion, and the fourth row disposed on the fourth plane portion, the third and fourth plane portions to comprise different planes of the second interior side.

9. The apparatus of claim 7, wherein a pin of the first row and a pin of the second row adjacent to the pin of the first row are substantially collinear with each other in a direction perpendicular to a major direction of the first and second rows.

10. The apparatus of claim 7, wherein a pin of the first row and a pin of the second row adjacent to the pin of the first row are non-collinear with each other in a direction perpendicular to a major direction of the first and second rows.

11. The apparatus of claim 7, wherein the fifth, sixth, seventh, and eighth rows are to electrically couple with a printed circuit board (PCB).

12. The apparatus of claim 7, wherein pins of the fifth, sixth, seventh, and eighth rows comprise through hole pins.

13. The apparatus of claim 7, wherein pins of the fifth, sixth, seventh, or eighth rows comprise surface mounting pins.

14. A method comprising:
generating or obtaining a data packet by one or more computing components; and
transmitting the data packet using at least one pin included in a first row of a plurality of pins and at least one pin included in a second row of a plurality of pins, wherein the first and second rows are disposed substantially parallel to each other on a same side of a peripheral device that includes the one or more computing components, wherein the first row is disposed on the first side between the one or more computing components and the second row;
wherein the same side of the peripheral device includes a first plane portion and a second plane portion, the first row disposed on the first plane portion and the second row disposed on the second plane portion, the first and second plane portions to comprise different planes of the same side.

15. The method of claim 14, further comprising:
receiving a second data packet using at least one pin included in a third row of a plurality of pins and at least one pin included in a fourth row of a plurality of pins, wherein the third and fourth rows are disposed substantially parallel to each other on another side of the peripheral device that is a side opposite the same side.

16. The method of claim 14, wherein the peripheral device comprises a peripheral component interconnect express (PCIe) card or a PCIe riser card.

* * * * *